(12) United States Patent
Schneefeld et al.

(10) Patent No.: US 6,199,744 B1
(45) Date of Patent: Mar. 13, 2001

(54) FRICTION WELDING PROCESS AND SHIELDING GAS SHOWER FOR CARRYING OUT THE PROCESS

(75) Inventors: Dieter Schneefeld, Walkertshofen; Erich Thaler, Dachau; Georg Muschal, Erding; Karl Katheder, Munich, all of (DE)

(73) Assignee: MTU Motoren- und Turbinen-Union Muenchen GmbH, Munich (DE)

( * ) Notice: Subject to any disclaimer, the term of this patent is extended or adjusted under 35 U.S.C. 154(b) by 0 days.

(21) Appl. No.: 09/125,657

(22) PCT Filed: Dec. 13, 1997

(86) PCT No.: PCT/EP97/07014
§ 371 Date: Oct. 6, 1998
§ 102(e) Date: Oct. 6, 1998

(87) PCT Pub. No.: WO98/28103
PCT Pub. Date: Jul. 2, 1998

(30) Foreign Application Priority Data

Dec. 23, 1996 (DE) .............................................. 196 54 123

(51) Int. Cl.[7] .................................................... B23K 20/12
(52) U.S. Cl. ........................ 228/112.1; 228/219; 228/2.1; 228/42; 239/290; 239/590
(58) Field of Search .................................. 228/112.1, 114, 228/219, 21, 42; 239/288, 290, 296, 590, 590.3, 590.5

(56) References Cited

U.S. PATENT DOCUMENTS

| 3,597,833 | * | 8/1971 | Frederick et al. | 228/136 |
|---|---|---|---|---|
| 3,875,364 | * | 4/1975 | Boyett | 219/74 |
| 4,871,894 | * | 10/1989 | Suzuki et al. | 219/93 |
| 5,314,106 | * | 5/1994 | Ambroziak et al. | 228/114.5 |
| 5,388,753 | * | 2/1995 | Bjorkman, Jr. | 228/42 |
| 5,393,948 | * | 2/1995 | Bjorkman, Jr. | 219/74 |
| 5,981,897 | * | 11/1999 | Offer et al. | 219/75 |

FOREIGN PATENT DOCUMENTS

| 3401078C1 | * | 1/1984 | (DE) | 228/114.5 |
|---|---|---|---|---|
| 0513669A2 | * | 5/1992 | (EP) | 228/112.1 |
| 0513669 | | 11/1992 | (EP) . | |
| 361092796A | * | 5/1986 | (JP) | 228/114.5 |
| 405131280A | * | 5/1993 | (JP) | 228/114.5 |

OTHER PUBLICATIONS

Patent Abstracts of Japan, vol. 095, Aug. 31, 1995 & JP 07 100669 A (Mitsubishi Heavy Ind Ltd), Apr. 18, 1995.*
Patent Abstract of Japan, Pub No. 07100669, Pub date Apr. 18, 1995.

* cited by examiner

Primary Examiner—Samuel M. Heinrich
(74) Attorney, Agent, or Firm—W. F. Fasse; W. G. Fasse

(57) ABSTRACT

The invention relates to a friction welding process for mounting blades of a blade carrier (1) of a flow machine as well as a shielding gas shower for supplying gas to welding surfaces. To achieve this, a plurality of longitudinally extending welding surfaces (5a) are provided on the circumference of the blade carrier (1), are oriented at a blade angle β relative to the rotation axis (R) of the blade carrier (1), and are respectively welded together with a welding surface (5b) of a blade (2). The welding temperature necessary for joining the bodies (blade carrier (1), blade (2)) is achieved by pressing together the welding surfaces (5a,b) and simultaneous oscillating relative motion (P) of the bodies (1, 2) in the welding plane (E), whereby a shielding gas (S) flows around the welding surfaces (5a,b) during the relative motion (P). The shielding gas flow S follows the contour of the blade carrier and the blade and thus serves to provide a closed shielding gas curtain for protecting the welding surface. In order to ensure a gas supply to the welding surfaces from all sides to the extent possible during the relative motion, the shielding gas shower, which is stationary relative to one of the bodies, comprises a gas outlet opening facing the welding surfaces.

15 Claims, 2 Drawing Sheets

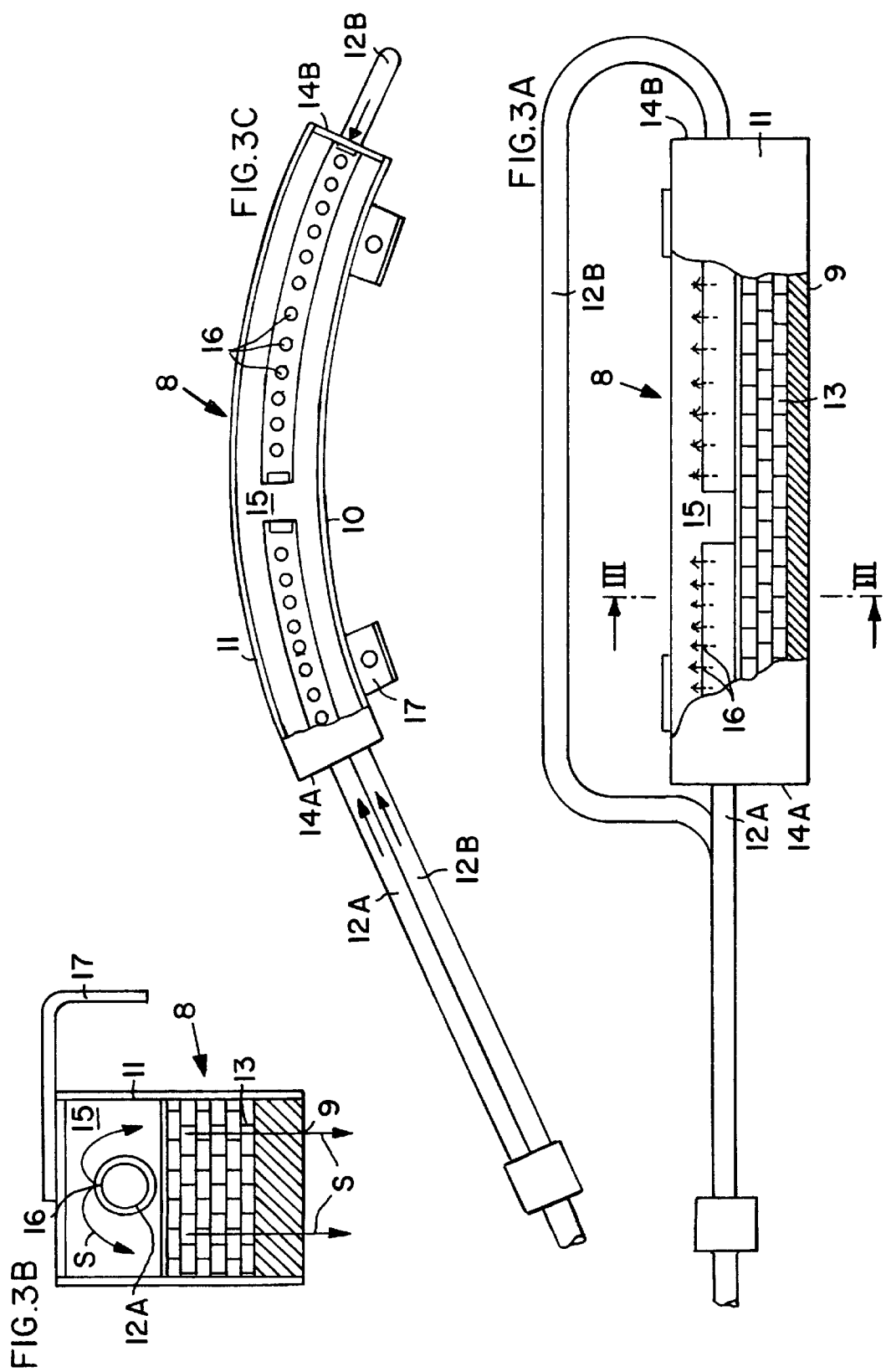

FRICTION WELDING PROCESS AND SHIELDING GAS SHOWER FOR CARRYING OUT THE PROCESS

The invention relates to a friction welding process according to the preamble of patent claim 1, as well as a shielding gas shower for carrying out the process according to claim 6. Such a friction welding process is disclosed in EP 513,669 B1.

Such friction welding processes serve for mounting the blades of a blade carrier of a flow machine, for example of entire disks (blisk) or a drum for a jet engine. The blade carrier comprises a conical or cylindrical contour, on the circumference of which a plurality of uniformly mutually spaced blades are welded by means of their blade roots. Both the circumference of the blade carrier as well as the blade root comprise a plane or slightly curved welding surface, and are pressed together by means of an upsetting compressing force in order to develop the necessary welding temperature, so that the area of the welding surfaces is heated to the welding temperature during the translational pendular motion of the blades relative to the blade carrier. The pendular motion is carried out perpendicularly to the longitudinally extending configured welding surface, and can amount to several millimeters in this context.

The friction welding process, which belongs to the class of pressure welding or plastic welding processes, distinguishes itself relative to typical gas or arc melt welding processes by a substantial insensitivity with respect to oxidation in the surrounding ambient air, because, due to the relative motion of the parts to be welded, firstly the access of surrounding ambient air is hindered, and secondly oxides are transported together with the molten material out of the weld zone due to the rubbing frictional motion. Nonetheless, defects have been discovered in the edge and corner areas in the weld seam due to oxide formation. Since such defects reduce the strength of the weld seam, the danger of a blade rupture exists during operation of the flow machine due to the high centrifugal forces.

Beginning from this background, it is an object of the invention to provide a friction welding process of the general type described above for mounting the blades of a blade carrier, which ensures a defect-free welded junction between the blade carrier and the blades. Moreover, a shielding gas shower of the general type described above is to be provided such that it can be employed for carrying out a friction welding process without hindering the relative motion between the bodies that are to be joined.

With regard to the process, the object is achieved according to the invention by means of the characterizing features of patent claim 1.

In contrast to the known rotational friction welding processes, in the welding process of the general type described above using an oscillating relative motion, it cannot be avoided that areas of the welding surfaces corresponding to the amplitude of the relative motion are exposed, and the exposed welding surface is subjected to oxidation due to access by air. In this context, the invention has the advantage that, due to the flowing of a shielding gas around the welding surfaces, these surfaces are surrounded by a shielding gas curtain, so that these are protected against access by air during their relative motion. Due to the fact that the blade and blade carrier form a flow grating, the surrounding flow of the shielding gas effectuates a similar flow field or pattern as occurs during operation of the blade carrier. In other words, the shielding gas flow follows the contour of the blade carrier and of the blade and thus serves to provide a closed shielding gas curtain for protecting the welding surface. Thus, no further measures are needed for maintaining the flow in the area of the welding surfaces, even during the relative motion of the bodies.

In this context it is advantageous to orient the welding surfaces, which are provided with an over-dimension relative to the finished part contours, at the blade angle $\beta$ and taper angle $\alpha$, so that the shielding gas flow that develops has a flow that lies against the hub area of the flow machine for as long as possible, similarly as in the case of operating the flow machine, whereby the welding surfaces remain covered by shielding gas. This effect is further reinforced in that the shielding gas flow encompasses at least that area passed over by the moving welding surface, which is made possible by corresponding expansion of the shielding gas flow in the direction of the pendular motion. By correspondingly orienting the shielding gas flow with respect to the taper angle $\alpha$ of the blade carrier and the angle of incidence $\beta$ of the welding surfaces, a largely adherent or contacting shielding gas flow is achieved in the area of the welding surfaces. In order to ensure a shielding gas supply with the minimum possible interference on the one hand, and the operation of the friction welding process without interference on the other hand, the direction of the shielding gas flow is oriented transverse or perpendicularly to the direction of the relative motion, whereby the relative motion carries out an essentially translational or slightly arc-shaped motion.

The object of the invention relating to the shielding gas shower is achieved according to the invention by means of the characterizing features of patent claim 6.

In order to achieve a supply of gas to the welding surfaces from all sides to the extent possible during the relative motion, the shielding gas shower, which is stationary relative to one of the bodies, comprises a gas outlet opening facing the welding surfaces. The expansion of the gas outlet opening in the motion direction has the advantage for the invention that the area passed over by the moving welding surface is gasable, i.e. can have gas supplied thereto, without gaps, and thus air access to the oxidation sensitive welding surfaces can be prevented. By means of the stationary construction of the shielding gas shower, firstly a defined area passed over by the shielding gas is achieved, and secondly the supply of the shielding gas to the shielding gas shower is simplified.

The arrangement of the shielding gas shower with a spacing perpendicular to the motion direction allows the friction welding process to be carried out unhindered, so that the geometrical motion sequences generally can be maintained. Also thereby, it becomes possible to achieve a gas showering of the welding surfaces that comes close to the actual flow conditions, so that the above initially mentioned advantages with regard to the flow guidance can optimally be ensured, especially since this makes it possible to achieve the gas outlet that is optimal for the flow guidance transversely or perpendicularly to the motion direction.

In an advantageous manner, the shielding gas shower is embodied corresponding to the contour of one of the bodies in the area of the welding surface. Generally, the shielding gas shower is mounted on the blade carrier that is stationary during the friction welding process, so that the shielding gas shower is embodied with an arc-shape corresponding to the cylindrical contour of the blade carrier. Thereby, the shielding gas shower can be mounted surfacially on the disk carrier, so that the access of air between the disk carrier and the shielding gas shower, and therewith an all too intensive mixing with the shielding gas in the area of the welding surfaces, can be prevented.

Further advantageous embodiments of the invention with regard to uniform distribution of the shielding gas over the outlet opening, are achieved by the features of patent claims 11 to 13.

A preferred embodiment of the invention will be described below with reference to the accompanying drawings, wherein:

FIG. 1 shows a partial view of a rotor disk for a flow machine with a mounted shielding gas shower;

FIG. 2 shows a view of the bladed disk along the section line I—I;

FIG. 3a shows a side view of the sectioned shielding gas shower;

FIG. 3b shows a cross-section through the shielding gas shower along the section line II—II in FIG. 3A; and FIG. 3c shows a sectioned top plan view of the shielding gas shower.

FIGS. 1 and 2 relate to the blade arrangement of a rotor disk for a flow machine such as a jet engine. The rotor disk comprises a blade carrier 1 embodied as a disk onto which a number of similar blades 2 are frictionally welded. The blade carrier 1 and the blades 2 are prepared of a titanium alloy. After the blades 2 or the blade raw blanks are frictionally welded onto the blade carrier 1, the blade roots are subjected to a finishing operation in which material is removed in order to give the blades 2 the final form. A typical blade 2 for axially constructed flow machines comprises a blade vane 3 and a blade root 4, which terminates in a flat planar welding surface 5a in the raw unfinished condition. The blade vane 3 is relatively long and thin in the radial direction, and comprises a curved form, whereby one major surface of the blade is concave and the other major surface of the blade is convex. The welding surface 5a as seen in a plan view comprises a contour that is similar to that of the blade profile. The quadratic block-shaped blade root adjoins the blade vane. The welding surface 5a is spaced by a few millimeters, approximately 2 to 8 mm, from the rest of the quadratic block-shaped part of the blade root 4 by means of a pedestal. During the friction welding, pendular, clamping, and compressive upsetting forces are applied via the blade root 4 onto the blade 2 or the welding surface 5a.

The blade carrier 1 comprises essentially planar, mutually parallel end faces 6a and 6b having a circular shaped plan view. The essentially rotationally symmetrically configured blade carrier 1 comprises a rotation axis R that corresponds to the rotation axis of the flow machine. The end faces 6a and 6b extend perpendicularly to the rotation axis R. The circumferential surface 7 of the blade carrier 1 extends between the outer edges of the end faces 6a and 6b.

A plurality of slightly protruding webs is formed on the circumferential surface 7. Each web is machined to a planar welding surface 5b, of which the contour essentially corresponds to the welding surface 5a of the blade 2. As can be seen in FIG. 1, the longitudinal axis L of each welding surface 5b is tilted by the blade angle β relative to a straight line parallel to the rotation axis R. The longitudinal axis L of a welding surface 5b essentially corresponds to the projected chord line of the blade root profile.

In practice, most blade carriers 1 are so configured that the circumferential surface 7 comprises a configuration corresponding to that of a conical-section. As can be seen in FIG. 2, the welding surfaces 5b or the blades 2 are mounted on the conical-section shaped section of the circumferential surface 7. A cylindrical section of the circumferential surface 7 adjoins the conical-section shaped section. The conical-section shaped section comprises a taper angle α relative to the cylindrical section.

For the friction welding process, the blade carrier 1 is secured in a position in such a manner that the welding surface 5b to be provided with blades lies in a plane E, which extends parallel to the direction P of the translational pendular motion. The welding surface 5b to be provided with blades thus is located in the so-called welding position. As can be seen in FIG. 1, the direction P of the pendular motion P, which the blade 2 carries out relative to the blade carrier 1, extends perpendicularly to the rotor axis R, while in FIG. 2 the direction of the pendular motion P is to be imagined as perpendicular to the drawing plane. During the friction welding of a blade 2 onto the blade carrier 1, the welding surface 5a of the blade 2 is brought into contact with the associated welding surface 5b of the blade carrier 1, as can be seen in FIG. 2. In order to develop the necessary welding temperature, a compressive upsetting force is applied to the blade 2 perpendicularly to the welding surfaces 5a,b, and simultaneously the blade 2 is moved rapidly back and forth relative to the blade carrier 1, so that friction heating is developed. If sufficient heat is developed, the pendular motion is discontinued and the compressive upsetting force is maintained, until the blade 2 is finally welded and connected to the blade carrier 1. Next, the blade carrier 1 is released and rotated into a position in which a further blade 2 can be welded on. This sequence is repeated until all blades 2 are welded onto the blade carrier 1.

The blade raw blanks are next subjected to a forming process, in which material is removed from each blade root 4, in order to achieve exactly the desired blade form. The forming process can be carried out both by chip removal as well as electrochemically.

The welding surfaces 5a' and 5a" shown by dashed lines in FIG. 1 indicate the extreme positions or the amplitude of the blade-side welding surface 5a, which this blade-side welding surface 5a carries out during the pendular motion or relative motion P with respect to the carrier-side welding surface 5b. In this context, the blade-side welding surface 5a passes over an area of which the largest dimension measures b in the direction of the pendular motion, that is to say perpendicularly to the rotor axis R. In this illustration it is made clear that the welding surfaces 5a,5b are temporarily only partly surfacially in contact with one another during the friction welding motion, so that the exposed partial surface would be exposed to access by air. This would have as a result, due to the air access, that an undesired oxide formation would take place on the welding surface, especially in the area of the ends or corners of the weld surfaces. In order to prevent this oxidation, which principally does not arise in the typical friction welding process, a gas showering of the weld surfaces 5a,5b by means of a shielding gas flow S is provided.

A shielding gas shower is mounted on a cylindrical circumferential section of the blade carrier 1 for the supply of the shielding gas. The shielding gas shower 8 comprises a circular arc-shaped curved gas outlet opening 9, which extends over the arc length l on the circumferential surface 7. The gas outlet opening 9, which extends perpendicularly to the rotor axis R, is spaced in the axial direction from the carrier-side welding surface 5b, whereby the spacing a is smaller than the dimension b, which designates the extension of the area that is passed over. In order to protect the welding surfaces 5a, 5b against air access from all sides, the length l of the gas outlet opening 9 is maintained at least 50% larger than the area b that is passed over by the weld surfaces 5a. By means of the central arrangement of the gas outlet opening 9 over the area b, it is ensured that even the outer ends of the welding surfaces 5a, 5b can be held within a closed shielding gas curtain during their motion. The dimension of the gas outlet opening 9 in the radial direction is also so dimensioned that a sufficient shielding gas curtain is formed, which prevents the entry of air.

The arrangement of the gas outlet opening 9 relative to the flow-impinged welding surfaces 5a,5b or the blade 2 enables a gas flow at the blade 2 at the blade angle β, which comes very close to the actual flow conditions during the operation of the flow machine, so that an adherent shielding gas flow S is formed, which sufficiently reduces a mixing with the surrounding ambient air at least in the area of the welding surfaces 5a, 5b. As shown by the flow lines S of FIGS. 1 and 2, the flow lines S substantially follow the contour of the blade root 4 in the area of the profiled welding surfaces 5a,b and the circumferential surface 7 tilted at the angle α.

In order to prevent the entry of air between the shielding gas shower and the circumferential surface 7 with a consequent mixing of the shielding gas with the surrounding ambient air, the shielding gas shower 8 is embodied with an arc-shape as can be seen in FIG. 3c, so that its radially inner housing wall 10 comes to lie against the circumferential surface 7 in a substantially gap-free manner.

As shown by the FIGS. 3a to 3c, the shielding gas shower 8 comprises a welded sheet metal housing 11, two pipe conduits 12a and 12b for the gas supply, and flow distribution means 13. The two pipe conduits 12a and 12b for supplying the gas are connected to the box and circular arc-shaped sheet metal housing 11, whereby respectively one pipe conduit 12a, 12b enters into the housing 11 at the end faces 14a,b of the circumferential ends of the housing wall 10. There, in the housing 11, the pipe conduits 12a, 12b extend in a gas chamber 15 to approximately the center of the sheet metal housing 11. The gas chamber 15 and the pipe conduits 12a, 12b extending therein are arranged approximately in an upper third in the shielding gas shower 8 on a side opposite the gas outlet opening 9. The pipe conduits 12a, 12b are perforated with numerous openings within the gas chamber 15, so that a uniform supply of the shielding gas into the gas chamber is ensured. On an opposite side of the gas chamber 15, the sheet metal housing 11 is opened and thus forms the longitudinally extending arc-shaped gas outlet opening 9. A means 13 for flow distribution, which is formed of many layers, comprising steel wool and filter material, is provided between the gas outlet opening 9 and the gas chamber 15, thus in the bottom half of the shielding gas shower 8. The layers of steel wool and filter material lead to a uniformalization of the shielding gas flow S over the entire gas outlet opening 9.

Two securing bails 17 are mounted on the sheet metal housing 11 for securing the shielding gas shower 8 on the blade carrier 1.

What is claimed is:

1. A friction welding process for mounting a blade on a blade carrier of a flow machine, wherein said blade carrier has a circumference and a carrier welding surface provided on said circumference and extending longitudinally oriented at a blade angle β relative to a line extending parallel to a rotation axis of said blade carrier on said circumference, and wherein said blade has a blade welding surface, said process comprising the steps of:

a) placing said blade so that said blade welding surface contacts said carrier welding surface;
 b) orienting said blade on said carrier welding surface so that a longitudinal dimension of a cross-section of said blade extends at said blade angle β;
 c) moving said blade and said blade carrier in an oscillatory motion relative to each other while contacting and pressing said blade against said blade carrier with a compressive force normal to said blade welding surface so as to frictionally generate a welding temperature sufficient to weld said blade to said blade carrier, wherein respective edge portions of said blade welding surface and said carrier welding surface are intermittently moved out of contact with each other and exposed due to said oscillatory motion; and
 d) flowing a shielding gas flow concurrently with said step of moving said blade and said blade carrier, while directing said shielding gas flow to flow in a flow direction that corresponds to said blade angle β directly along said intermittently exposed respective edge portions of said welding surfaces and directly along a circumference of said blade carrier to provide a shielded welding area that encompasses said carrier welding surface to which said blade is being welded.

2. The friction welding process according to claim 1, wherein said oscillatory motion is an essentially translational motion.

3. The friction welding process according to claim 1, wherein said oscillatory motion is an essentially arc-shaped motion.

4. The friction welding process according to claim 1, wherein said circumference of said blade carrier includes a conically tapering surface that tapers relative to said rotation axis at a taper angle α, and wherein said step d) comprises directing said shielding gas flow so that said flow direction further corresponds to said taper angle α and said shielding gas flow maintains direct contact along said conically tapering surface.

5. The friction welding process according to claim 1, wherein said oscillatory motion is carried out over a full excursion distance b that corresponds to a full excursion of a complete motion cycle of said blade relative to said blade carrier in a circumferential direction around said rotation axis, and said shielded welding area has a length dimension l in said circumferential direction that encompasses and is at least as large as said full excursion dimension b, so that said shielded welding area completely encloses said intermittently exposed edge portions of said welding surfaces.

6. The friction welding process according to claim 5, wherein said length dimension l of said shielded welding area overlaps and is at least 50% larger than said full excursion distance b.

7. The friction welding process according to claim 1, wherein said step d) comprises directing said shielding gas flow transversely relative to a direction of said oscillatory motion.

8. A shielding gas apparatus for providing a shielding gas flow for a friction welding process, said apparatus comprising a housing that includes a cylindrically curved solid wall and an annular side and that encloses a gas plenum space therein, and a gas supply conduit connected to said housing and communicating into said gas plenum space, wherein said cylindrically curved solid wall curves along a partial circular arc about a center axis and is oriented facing toward said center axis, wherein said annular side extends over a partial circular annulus along a radial plane perpendicular to said center axis, wherein said annular side has at least one gas outlet opening that communicates out from said gas plenum space and is configured so as to direct a shielding gas flow from said apparatus in the form of a partial cylindrical gas curtain directed parallel to said center axis.

9. The shielding gas apparatus according to claim 8, wherein said gas supply conduit protrudes into and extends internally along said gas plenum space.

10. The shielding gas apparatus according to claim 9, wherein said gas supply conduit extending internally along said gas plenum space is perforated with perforation holes adapted to distribute shielding gas into said gas plenum space.

11. The shielding gas apparatus according to claim 10, wherein said perforation holes are provided only on a side of said gas supply conduit facing away from said annular side of said housing.

12. The shielding gas apparatus according to claim 8, further comprising a gas distributor arrangement interposed between said gas plenum space and said gas outlet opening.

13. The shielding gas apparatus according to claim 12, wherein said gas distributor arrangement comprises at least one of steel wool and filter material.

14. A combination of a shielding gas apparatus, a blade carrier, a blade that is to be frictionally welded onto said blade carrier, and a blade moving device adapted to relatively move said blade and said blade carrier, wherein:

said blade carrier is bounded by a circumferential surface that curves circularly about a center axis and that includes a carrier welding surface;

said blade includes a blade body and a blade welding surface, which is arranged and pressed into contact with said carrier welding surface;

said blade is oriented with a chord line of said blade extending at a blade angle β relative to a straight line parallel to said center axis on said circumferential surface;

said blade moving device is adapted to move said blade oscillatingly back-and-forth in an oscillation range (b) in a motion direction tangent to said circumferential surface in a plane perpendicular to said center axis, so as to develop frictional heat in said blade welding surface and said carrier welding surface;

said shielding gas apparatus is mounted stationary relative to one of said blade and said blade carrier;

said shielding gas apparatus comprises a housing and a gas supply conduit communicating into said housing, wherein said housing has at least one gas outlet opening oriented so as to direct a flow of shielding gas from said apparatus onto said blade in a direction perpendicular to said motion direction;

said apparatus is spaced away from said blade perpendicular to said motion direction; and said at least one gas outlet opening extends over an arcuate length (l) parallel to said motion direction, wherein said arcuate length (l) is at least equal to said oscillation range (b), so that said at least one gas outlet opening is adapted to form said flow of shielding gas as a partial cylindrical gas curtain that flows along said circumferential surface around said blade while completely enveloping said oscillation range (b).

15. The combination according to claim 14, wherein said housing of said apparatus includes an arcuately curved wall that is arranged matingly surfacially contacting said circumferential surface.

* * * * *

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Title page,
Lines 1 to 22 Item [57] ABSTRACT, replace to read:
-- A friction welding process is especially for mounting blades on a blade carrier (1) of a flow machine, using a shielding gas shower for supplying gas to the welding surface. A plurality of longitudinally extending welding surfaces (5a) are provided on the circumference of the blade carrier (1), are oriented at a blade angle $\beta$ relative to the rotation axis (R) of the blade carrier (1), and are respectively welded together with a welding surface (5b) of a blade (2). The welding temperature necessary for joining the blade carrier (1) with the blade (2) is achieved by pressing together the welding surfaces (5a,b) and simultaneously oscillating the components (1, 2) relative to each other in the welding plane (E), whereby a shielding gas (S) flows around the welding surfaces (5a,b) during the relative motion (P). The shielding gas flow (S) follows the contour of the blade carrier and the blade and thus provides a closed shielding gas curtain for protecting the welding surface. In order to ensure a gas supply to the welding surfaces from all sides to the extent possible during the relative motion, the shielding gas shower is stationary relative to one of the bodies, and comprises a gas outlet opening facing the welding surfaces. The gas outlet opening extends in the direction of motion so that the area passed over by the moving welding surface is supplied with gas in a gap-free manner, and thereby air access to the oxidation sensitive welding surface can be prevented. --

Specification,
Column 1,
Line 1 to line 9, Please delete and replace the paragraph at to read as follows:
-- FRICTION WELDING PROCESS AND SHIELDING GAS SHOWER FOR CARRYING OUT THE PROCESS
FIELD OF THE INVENTION
The invention relates to a friction welding process especially for mounting blades of a flow machine onto a blade carrier, as well as a shielding gas shower for carrying out the process. --

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Line 10 to line 25, Please delete and replace the paragraph at to read as follows:
-- BACKGROUND INFORMATION
An example of such a friction welding process is disclosed in EP 513,669 B1. Such friction welding processes serve for mounting the blades of a blade carrier of a flow machine, for example of entire disks (blisk) or a drum for a jet engine. The blade carrier comprises a conical or cylindrical contour, on the circumference of which a plurality of uniformly mutually spaced blades are welded by means of their blade roots. Both the circumference of the blade carrier as well as the blade root comprise a plane or slightly curved welding surface, and are pressed together by means of an upsetting compressing force in order to develop the necessary welding temperature, so that the area of the welding surfaces is heated to the welding temperature during the translational oscillating motion of the blades relative to the blade carrier. The oscillating motion is carried out perpendicularly to the longitudinally extending configured welding surface, and can amount to several millimeters in this context. --

Line 26 to line 39, Please delete and replace the paragraph at to read as follows:
-- The friction welding process, which belongs to the class of pressure welding or plastic welding processes, distinguishes itself relative to typical gas or arc melt welding processes by a substantially insensitivity with respect to oxidation in the surrounding ambient air, because firstly, the relative motion of the parts to be welded hinders the access of surrounding ambient air, and secondly, the rubbing frictional motion transports oxides together with the molten material out of the weld zone. Nonetheless, defects have been discovered in the edge and corner areas in the weld seam due to oxide formation. Since such defects reduce the strength of the weld seam, the danger of a blade rupture exists during operation of the flow machine due to the high centrifugal force. --

Line 40 to line 48, Please delete and replace the paragraph at to read as follows:
-- SUMMARY OF THE INVENTION
In view of the above, it is an object of the present invention to provide a friction welding process of the general type described above for mounting the blades of a blade carrier, which ensures a defect-free welded joint between the blade carrier and the blades. Moreover, it is a further obect of the present invention to provide a shielding gas shower of the general type described above, that will shield welding surfaces from ambient air in a friction welding process without hindering the relative motion between the bodies that are to be joined. --

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Line 49 to line 51, Please delete and replace the paragraph at to read as follows:
-- With regard to the process, the object is achieved according to the invention in a friction welding process including a step of providing a flow of shielding gas around the welding surfaces of the bodies to be welded while the bodies move relative to each other and without hindering the welding process. --

Line 52 to Col. 2, line 4, Please delete and replace the paragraph at to read as follows:
-- In the known rotational friction welding process, a round body is rotated on a second stationary body to create the weld. During the rotation, no welding surface is exposed. By contrast, when welding bodies with an oscillating motion, it is unavoidable that some areas of the welding surfaces corresponding to the amplitude of the relative motion are exposed, and the exposed welding surface is subjected to oxidation due to access by air. The process according to the present invention provides the advantage that, due to the flowing of a shielding gas around the welding surfaces, the exposed welding surfaces are surrounded by a shielding gas curtain, so that they are protected from exposure to air during their relative motion. Due to the fact that the blade and blade carrier form a flow grid, the surrounding flow of the shielding gas effectuates a similar flow field or pattern as occurs during operation of the blade carrier. In other words, the shielding gas flow follows the contour of the blade carrier and of the blade and thus serves to provide a close shielding gas curtain for protecting the welding surface. Thus, no further measures are needed for maintaining the flow in the area of the welding surfaces, even during the relative motion of the bodies. --

Column 2,
Line 5 to line 27, Please delete and replace the paragraph at to read as follows
-- In this context it is advantageous to orient the welding surfaces, which are provided with an over-dimension relative to the finished part contours, at the blade angle $\beta$ and taper angle $\alpha$, so that a shielding gas flow develops the longest possible flow of shielding gas along the hub area of the flow machine, similar to operating conditions of the flow machine, whereby the welding surfaces remain covered by shielding gas. This effect is further reinforced in that the shielding gas flow encompasses at least that area passed over by the moving welding surface, which is made possible by corresponding expansion of the shielding gas flow in the direction of the oscillating motion. By correspondingly orienting the shielding gas flow with respect to the taper angle $\alpha$ of the blade carrier and the angle of incidence $\beta$ of the welding surfaces, a largely adherent or contacting shielding gas flow is achieved in the area of the welding surfaces. In order to ensure a shielding gas supply with the minimum possible interference on the one hand, and the operation of the friction welding process without interference on the other hand, the direction of the shielding gas flow is oriented transverse or perpendicularly to the direction of the relative motion, whereby the relative motion carries out an essentially translational or slightly arc-shaped motion. --

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Line 28 to line 44, Please delete and replace the paragraph at to read as follows:
-- The above object of the invention relating to the shielding gas shower is achieved according to the invention by configuring and arranging the shielding gas shower so as to direct a supply of gas to the welding surfaces from all sides to the extent possible during the relative motion. The shielding gas shower, which is stationary relative to one of the bodies, comprises a gas outlet opening facing the welding surfaces. The gas outlet opening is expanded or extended in the direction of the motion and provides the advantage that the area passed over by the moving welding surface is gasable, i.e. can have gas supplied thereto, without gaps, thus preventing air access to the oxidation sensitive welding surfaces. Furthermore, the stationary construction of the shielding gas shower, firstly defines an area passed over by the shielding gas and secondly simplifies the supply of the shielding gas to the shielding gas shower. --

Line 45 to line 55, Please delete and replace the paragraph at to read as follows:
-- The shielding gas shower is arranged with a spacing relative to the components to be welding, perpendicular to the motion direction. This arrangement allows the friction welding process to be carried out unhindered, and the geometrical motion sequences generally can be maintained. It also is possible to achieve a gas showering of the welding surfaces that comes close to the actual flow conditions, so that the above initially mentioned advantages with regard to the flow guidance can optimally be ensured. This is particularly so because this arrangement allows for a gas exit from the shower that is optimal for flow guidance, in a direction that is transverse or perpendicular to the motion direction. --

Line 56 to line 67, Please delete and replace the paragraph at to read as follows:
-- In an advantageous manner, the shielding gas shower is embodied corresponding to the contour of one of the bodies or components being welded in the area of the welding surface. Generally, the shielding gas shower is mounted on the blade carrier that is stationary during the friction welding process, so that the shielding gas shower is embodied with an arc-shape corresponding to the cylindrical contour of the blade carrier. The sihelding gas shower can thereby be mounted surfacially on the blade carrier. This has the advantage that it prevents the access of air between the blade carrier and the shielding gas shower, and also an all-too-intensive mixing with the shielding gas in the area of the welding surfaces. --

Column 3,
Line 1 to line 4, Please delete and replace the paragraph at to read as follows:
-- Further advantageous embodiments of the invention with regard to uniform distribution of the shielding gas over the outlet opening, are evident from the remainder of the present specification. --

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Line 5 to line 7, Please delete and replace the paragraph at to read as follows:
BRIEF DESCRIPTION OF THE DRAWINGS
-- In order that the invention may be clearly understood, it will now be described in connection with example embodiments, with reference to the accompanying drawings, wherein: --
Line 8 to line 9, Please delete and replace the paragraph at to read as follows:
-- Fig. 1 shows a partial view of a rotor disk for a flow machine with a shielding gas shower mounted thereon; --
Line 10 to line 11, Please delete and replace the paragraph at to read as follows:
-- Fig. 2 shows a sectional view of the bladed disk alog the section line I—I of FIG. 1; --
Line 12 to line 13, Please delete and replace the paragraph at to read as follows:
-- Fig. 3a shows a side view of the sectioned or partially broken open shielding gas shower; --
Line 14 to line 15, Please delete and replace the paragraph at to read as follows:
-- Fig. 3b shows a cross-section through the shielding gas shower along the section line III—III in FIG. 3A; --
Line 16 to line 17, Please delete and replace the paragraph at to read as follows:
-- Fig. 3c shows a sectioned top plan view of the shielding gas shower. --
Line 18 to line 41, Please delete and replace the paragraph at to read as follows:
-- DETAILED DESCRIPTION OF PREFERRED EXAMPLE EMBODIMENTS AND OF THE BEST MODE OF THE INVENTION Figs. 1 and 2 relate to the blade arrangement of a rotor disk for a flow machine such as a jet engine. The rotor disk comprises a blade carrier 1 embodied as a disk onto which a number of similar blades 2 are frictionally welded. The blade carrier 1 and the blades 2 are prepared of a titanium alloy. After the blades 2 or the blade raw blanks are frictionally welded onto the blade carrier 1, the blade roots are subjected to a finished operation in which material is removed in order to give the blades 2 the final form. A typical blade 2 for axially constructed flow machines comprises a blade vane 3 and a blade root 4, which terminates in a flat planar welding surface 5a in the raw unfinished condition. The blade vane 3 is relatively long and thin in the radial direction, and comprises a curved form, whereby one major surface of the blade is concave and the other major surface of the blade is convex. The welding surface 5a as seen in a plan view comprises a contour that is similar to that of the blade profile. The quadratic block-shaped blade root 4 adjoins the blade vane 3. The welding surface 5a is spaced by a few millimeters, approximately 2 to 8 mm, from the rest of the quadratic block-shaped part of the blade root 4 by means of a pedestal. During the friction welding, oscillating, clamping, and compressive upsetting forces are applied via the blade root 4 onto the blade 2 or the welding surface 5a. --

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Line 42 to line 49, Please delete and replace the paragraph at to read as follows:
-- The blade carrier 1 comprises essentially planar, mutually parallel end faces 6a and 6b having a circular shaped plan view. The essentially rotationally symmetrically configured blade carrier 1 comprises a rotation axis R that corresponds to the rotation axis of the flow machine. The end faces 6a and 6b extend perpendicularly to the rotation axis R. The circumferential surface 7 of the blade carrier 1 extends between the outer edges of the end faces 6a and 6b. --

Line 50 to line 58, Please delete and replace the paragraph at to read as follows:
-- A plurality of slightly protruding webs 7a is formed on the circumferential surface 7. Each web 7a is machined to a planar welding surface 5b, of which the contour essentially corresponds to the welding surface 5a of the blade 2. As can be seen in Fig. 1, the longitudinal axis L of each welding surface 5b is tilted by the blade angle $\beta$ relative to a straight line parallel to the rotation axis R. The longitudinal axis L of a welding surface 5b essentially corresponds to the projected chord line of the blade root profile. --

Line 59 to line 67, Please delete and replace the paragraph at to read as follows:
-- In practice, most blade carriers 1 are so configured that the circumferential surface 7 comprises a configuration corresponding to that of a conical-section. As can be seen in Fig. 2, the welding surfaces 5b or the blades 2 are mounted on a conical-section shaped section 7b of the circumferential surface 7. A cylindrical section 7c of the circumferential surface 7 adjoins the conical-section shaped section 7b. The conical-section shaped section 7b comprises a taper angle $\alpha$ relative to the cylindrical section. --

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Column 4,
Line 1 to line 26, Please delete and replace the paragraph at to read as follows:
-- For the friction welding process, the blade carrier 1 is secured in a position in such a manner that the welding surface 5b to be provided with blades lies in a plane E, which extends parallel to the direction P of the translation oscillating motion. The welding surface 5b to be provided with blades thus is located in the so-called welding position. As can be seen in Fig. 1, the direction P of the oscillating motion P, which the blade 2 carries out relative to the blade carrier 1, extends perpendicularly to the rotor axis R, while in Fig. 2 the direction of the oscillating motion P is to be imagined as perpendicular to the drawing plane. During the friction welding of a blade 2 onto the blade carrier 1, the welding surface 5a of the blade 2 is brought into contact with the associated welding surface 5b of the blade carrier 1, as can be seen in Fig. 2. In order to develop the necessary welding temperature, a compressive upsetting force is applied to the blade 2 perpendicularly to the welding surfaces 5a,b, and simultaneously the blade 2 is moved rapidly back and forth relative to the blade carrier 1, so that friction heat is developed. If sufficient heat is developed, the oscillating motion is discontinued and the upsetting force is maintained, until the blade 2 is finally welded and connected to the blade carrier 1. Next, the blade carrier 1 is released and rotated into a position in which a further blade 2 can be welded on. This sequence is repeated until all blades 2 are welded onto the blade carrier 1. --
Line 27 to line 31, Please delete and replace the paragraph at to read as follows:
-- The blade raw blanks are next subjected to a forming process, in which material is removed from each blade root 4, in order to achieve exactly the desired blade form. The forming process can be carried out both by chip removal as well as electrochemically. --
Line 32 to line 51, Please delete and replace the paragraph at to read as follows:
-- The welding surfaces 5a' and 5a" shown by dashed lines in Fig. 1 indicate the extreme positions or the amplitude of the blade-side welding surface 5a, which this blade-side welding surface 5a carries out during the oscillating motion or relative motion P with respect to the carrier-side welding surface 5b. In this context, the blade-side welding surface 5a passes over an area of which the largest dimension measures *b* in the direction of the oscillating motion, that is to say perpendicular to the rotor axis R. As can be seen in Fig. 1, the welding surfaces 5a,5b are temporarily only partly surfacially in contact with one another during the friction welding motion, so that the exposed partial surface would be exposed to access by air. This would result, due to exposure to the air, in an undesired oxide formation on the welding surface, especially in the area of the ends or corners of the weld surfaces. In order to prevent this oxidation, which in principle does not arise in the typical friction welding process, a gas shower 8 is provided that showers the weld surfaces 5a, 5b with a shielding gas flow S. --

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Line 52 to Col. 5, line 4, Please delete and replace the paragraph at to read as follows:
-- The shielding gas shower 8 is mounted on the cylindrical circumferential section 7c of the blade carrier 1 for the supply of the shielding gas. The shielding gas shower 8 comprises a circular arc-shaped curved gas outlet opening 9, which extends over the arc length $l$ on the circumferential surface 7. The gas outlet opening 9, which extends perpendicuarly to the rotor axis R, is spaced in the axial direction from the carrier-side welding surface 5b, whereby the spacing $a$ is smaller than the dimension $b$, which designates the extension of the area that is passed over. In order to protect the welding surfaces 5a, 5b against air access from all sides, the length $l$ of the gas outlet opening 9 is maintained at least 50% larger than the area $b$ that is passed over by the weld surfaces 5a. The central arrangement of the gas outlet opening 9 over the area $b$ ensures that even the outer ends of the welding surfaces 5a, 5b can be held within a closed shielding gas curtain for the full extent of the oscillating motion. The dimension of the gas outlet opening 9 in the radial direction is also so dimensioned that a sufficient shielding gas curtain is formed, which prevents the entry of air. --

Column 5,
Line 5 to line 15, Please delete and replace the paragraph at to read as follows:
-- The arrangement of the gas outlet opening 9 relative to the flow-impinged welding surfaces 5a,5b or the blade 2 enables a gas flow at the blade 2 at the blade angle $\beta$, which comes very close to the actual flow conditions during the operation of the flow machine, so that an adherent shielding gas flow S is formed, which sufficiently reduces a mixing with the surrounding ambient air at least in the area of the welding surfaces 5a, 5b. As shown by the flow lines S of Figs. 1 and 2, the flow lines S substantially follow the contour of the blade root 4 in the area of the profiled welding surfaces 5a,b and the conical-section shaped section 7b of the circumferential surface 7 tilted at the angle $\alpha$. --
Line 16 to line 22, Please delete and replace the paragraph at to read as follows:
-- In order to prevent the entry of air between the shielding gas shower and the circumferential surface 7 with a consequent mixing of the shielding gas with the surrounding ambient air, the shielding gas shower 8 is embodied with an arc-shape as can be seen in Fig. 3c, so that its radially inner housing wall 10 lies against the cylindrical section 7c of the circumferential surface 7 in a substantially gap-free manner. --

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Line 23 to line 48, Please delete and replace the paragraph at to read as follows:
-- As shown by the Figs. 3a to 3c, the shielding gas shower 8 comprises a welded sheet metal housing 11, two pipe conduits 12a and 12b for the gas supply, and flow distribution means 13. The two pipe conduits 12a and 12b for supplying the gas are connected to the box and circular arc-shaped sheet metal housing 11, whereby respectively one pipe conduit 12a, 12b enters into the housing 11 at each of the end faces 14a,b of the circumferential ends of the housing wall 10. There, in the housing 11, the pipe conduits 12a, 12b extend in a gas chamber 15 to approximately the center of the sheet metal housing 11. The gas chamber 15 and the pipe conduits 12a, 12b extending therein are arranged approximately in an upper third in the shielding gas shower 8 on a side opposite the gas outlet opening 9. The pipe conduits 12a, 12b are perforated with numerous openings within the gas chamber 15, so that a uniform supply of the shielding gas into the gas chamber is ensured. On an opposite side of the gas chamber 15, the sheet metal housing 11 is opened and thus forms the longitudinally extending arc-shaped gas outlet opening 9. A means 13 for flow distribution, which is formed of many layers, comprising steel wool and filter material, is provided between the gas outlet opening 9 and the gas chamber 15, thus in the bottom half of the shielding gas shower 8. The layers of steel wool and filter material lead to a uniformalization of the shield gas flow S over the entire gas outlet opening 9. --

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Please delete and replace the paragraph at Col. 5, line 49 to line 51, to read as follows Two securing bails 17 are mounted on the sheet metal housing 11 for securing the shielding gas shower 8 on the blade carrier 1.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

Signed and Sealed this

Twenty-third Day of October, 2001

Attest:

*Nicholas P. Godici*

NICHOLAS P. GODICI
*Acting Director of the United States Patent and Trademark Office*

*Attesting Officer*

UNITED STATES PATENT AND TRADEMARK OFFICE
CERTIFICATE OF CORRECTION

PATENT NO.    : 6,199,744 B1
DATED         : March 13, 2001
INVENTOR(S)   : Schneefeld et al.

It is certified that error appears in the above-identified patent and that said Letters Patent is hereby corrected as shown below:

Title page,
Under item [57], ABSTRACT, replace lines 1 to 22 to read as follows:

> A friction welding process is especially for mounting blades on a blade carrier (1) of a flow machine, using a shielding gas shower for supplying gas to the welding surfaces. A plurality of longitudinally extending welding surfaces (5a) are provided on the circumference of the blade carrier (1), are oriented at a blade angle $\beta$ relative to the rotation axis (R) of the blade carrier (1), and are respectively welded together with a welding surface (5b) of a blade (2). The welding temperature necessary for joining the blade carrier (1) with the blade (2) is achieved by pressing together the welding surfaces (5a,b) and simultaneously oscillating the components (1, 2) relative to each other in the welding plane (E), whereby a shielding gas (S) flows around the welding surfaces (5a,b) during the relative motion (P). The shielding gas flow (S) follows the contour of the blade carrier and the blade and thus provides a closed shielding gas curtain for protecting the welding surface. In order to ensure a gas supply to the welding surfaces from all sides to the extent possible during the relative motion, the shielding gas shower is stationary relative to one of the bodies, and comprises a gas outlet opening facing the welding surfaces. The gas outlet opening extends in the direction of motion so that the area passed over by the moving welding surface is supplied with gas in a gap-free manner, and thereby air access to the oxidation sensitive welding surface can be prevented.

Please delete and replace the paragraph at Col. 1, line 1 to line 9, to read as follows > FRICTION WELDING PROCESS AND SHIELDING GAS SHOWER FOR CARRYING OUT THE PROCESS
>
> FIELD OF THE INVENTION
>
> The invention relates to a friction welding process especially for mounting blades of a flow machine onto a blade carrier, as well as a shielding gas shower for carrying out the process.

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Please delete and replace the paragraph at Col. line 10 to line 25, to read as follows

BACKGROUND INFORMATION

An example of such a friction welding process is disclosed in EP 513,669 B1. Such friction welding processes serve for mounting the blades of a blade carrier of a flow machine, for example of entire disks (blisk) or a drum for a jet engine. The blade carrier comprises a conical or cylindrical contour, on the circumference of which a plurality of uniformly mutually spaced blades are welded by means of their blade roots. Both the circumference of the blade carrier as well as the blade root comprise a plane or slightly curved welding surface, and are pressed together by means of an upsetting compressing force in order to develop the necessary welding temperature, so that the area of the welding surfaces is heated to the welding temperature during the translational oscillating motion of the blades relative to the blade carrier. The oscillating motion is carried out perpendicularly to the longitudinally extending configured welding surface, and can amount to several millimeters in this context.

Please delete and replace the paragraph at Col. 1, line 26 to line 39, to read as follows The friction welding process, which belongs to the class of pressure welding or plastic welding processes, distinguishes itself relative to typical gas or arc melt welding processes by a substantial insensitivity with respect to oxidation in the surrounding ambient air, because firstly, the relative motion of the parts to be welded hinders the access of surrounding ambient air, and secondly, the rubbing frictional motion transports oxides together with the molten material out of the weld zone. Nonetheless, defects have been discovered in the edge and corner areas in the weld seam due to oxide formation. Since such defects reduce the strength of the weld seam, the danger of a blade rupture exists during operation of the flow machine due to the high centrifugal forces.

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Please delete and replace the paragraph at Col. 1, line 40 to line 48, to read as follows

SUMMARY OF THE INVENTION

In view of the above, it is an object of the present invention to provide a friction welding process of the general type described above for mounting the blades of a blade carrier, which ensures a defect-free welded joint between the blade carrier and the blades. Moreover, it is a further object of the present invention to provide a shielding gas shower of the general type described above, that will shield welding surfaces from ambient air in a friction welding process without hindering the relative motion between the bodies that are to be joined.

Please delete and replace the paragraph at Col. 1, line 49 to line 51, to read as follows With regard to the process, the object is achieved according to the invention in a friction welding process including a step of providing a flow of shielding gas around the welding surfaces of the bodies to be welded while the bodies move relative to each other and without hindering the welding process.

Please delete and replace the paragraphs at Col. 1, line 52 to Col. 2, line 4, to read as follows In the known rotational friction welding process, a round body is rotated on a second stationary body to create the weld. During the rotation, no welding surface is exposed. By contrast, when welding bodies with an oscillating motion, it is unavoidable that some areas of the welding surfaces corresponding to the amplitude of the relative motion are exposed, and the exposed welding surface is subjected to oxidation due to access by air. The process according to the present invention provides the advantage that, due to the flowing of a shielding gas around the welding surfaces, the exposed welding surfaces are surrounded by a shielding gas curtain, so that they are protected from exposure to air during their relative motion. Due to the fact that the blade and blade carrier form a flow grid, the surrounding flow of the shielding gas effectuates a similar flow field or pattern as occurs during operation of the blade carrier. In other words, the shielding gas flow follows the contour of the blade carrier and of the blade and thus serves to provide a closed shielding gas curtain for protecting the welding surface. Thus, no further measures are needed for maintaining the flow in the area of the welding surfaces, even during the relative motion of the bodies.

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Please delete and replace the paragraph at Col. 2, line 5 to line 27, to read as follows > In this context it is advantageous to orient the welding surfaces, which are provided with an over-dimension relative to the finished part contours, at the blade angle $\beta$ and taper angle $\alpha$, so that a shielding gas flow develops the longest possible flow of shielding gas along the hub area of the flow machine, similar to operating conditions of the flow machine, whereby the welding surfaces remain covered by shielding gas. This effect is further reinforced in that the shielding gas flow encompasses at least that area passed over by the moving welding surface, which is made possible by corresponding expansion of the shielding gas flow in the direction of the oscillating motion. By correspondingly orienting the shielding gas flow with respect to the taper angle $\alpha$ of the blade carrier and the angle of incidence $\beta$ of the welding surfaces, a largely adherent or contacting shielding gas flow is achieved in the area of the welding surfaces. In order to ensure a shielding gas supply with the minimum possible interference on the one hand, and the operation of the friction welding process without interference on the other hand, the direction of the shielding gas flow is oriented transverse or perpendicularly to the direction of the relative motion, whereby the relative motion carries out an essentially translational or slightly arc-shaped motion.

Please delete and replace the paragraph at Col. 2, line 28 to line 44, to read as follows > The above object of the invention relating to the shielding gas shower is achieved according to the invention by configuring and arranging the shielding gas shower so as to direct a supply of gas to the welding surfaces from all sides to the extent possible during the relative motion. The shielding gas shower, which is stationary relative to one of the bodies, comprises a gas outlet opening facing the welding surfaces. The gas outlet opening is expanded or extended in the direction of the motion and provides the advantage that the area passed over by the moving welding surface is gasable, i.e. can have gas supplied thereto, without gaps, thus preventing air access to the oxidation sensitive welding surfaces. Furthermore, the stationary construction of the shielding gas shower, firstly defines an area passed over by the shielding gas and secondly simplifies the supply of the shielding gas to the shielding gas shower.

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Please delete and replace the paragraph at Col. 2, line 45 to line 55, to read as follows > The shielding gas shower is arranged with a spacing relative to the components to be welded, perpendicular to the motion direction. This arrangement allows the friction welding process to be carried out unhindered, and the geometrical motion sequences generally can be maintained. It also is possible to achieve a gas showering of the welding surfaces that comes close to the actual flow conditions, so that the above initially mentioned advantages with regard to the flow guidance can optimally be ensured. This is particularly so because this arrangement allows for a gas exit from the shower that is optimal for flow guidance, in a direction that is transverse or perpendicular to the motion direction.

Please delete and replace the paragraph at Col. 2, line 56 to line 67, to read as follows > In an advantageous manner, the shielding gas shower is embodied corresponding to the contour of one of the bodies or components being welded in the area of the welding surface. Generally, the shielding gas shower is mounted on the blade carrier that is stationary during the friction welding process, so that the shielding gas shower is embodied with an arc-shape corresponding to the cylindrical contour of the blade carrier. The shielding gas shower can thereby be mounted surfacially on the blade carrier. This has the advantage that it prevents the access of air between the blade carrier and the shielding gas shower, and also an all-too-intensitive mixing with the shielding gas in the area of the welding surfaces.

Please delete and replace the paragraph at Col. 3, line 1 to line 4, to read as follows > Further advantageous embodiments of the invention with regard to uniform distribution of the shielding gas over the outlet opening, are evident from the remainder of the present specification.

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Please delete and replace the paragraph at Col. 3, line 5 to line 7, to read as follows

BRIEF DESCRIPTION OF THE DRAWINGS

In order that the invention may be clearly understood, it will now be described in connection with example embodiments, with reference to the accompanying drawings, wherein:

Please delete and replace the paragraph at Col. 3, line 8 to line 9, to read as follows

Please delete and replace the paragraph at Col. 3, line 10 to line 11, to read as follows

Please delete and replace the paragraph at Col. 3, line 12 to line 13, to read as follows Fig. 3a shows a side view of the sectioned or partially broken open shielding gas shower;

Please delete and replace the paragraph at Col. 3, line 14 to line 15, to read as follows Fig. 3b shows a cross-section through the shielding gas shower along the section line III-III in FIG. 3A; and Please delete and replace the paragraph at Col. 3, line 16 to line 17, to read as follows Fig. 3c shows a sectioned top plan view of the shielding gas shower.

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Please delete and replace the paragraph at Col. 3, line 18 to line 41, to read as follows

DETAILED DESCRIPTION OF PREFERRED EXAMPLE EMBODIMENTS AND OF THE BEST MODE OF THE INVENTION

Figure 1:
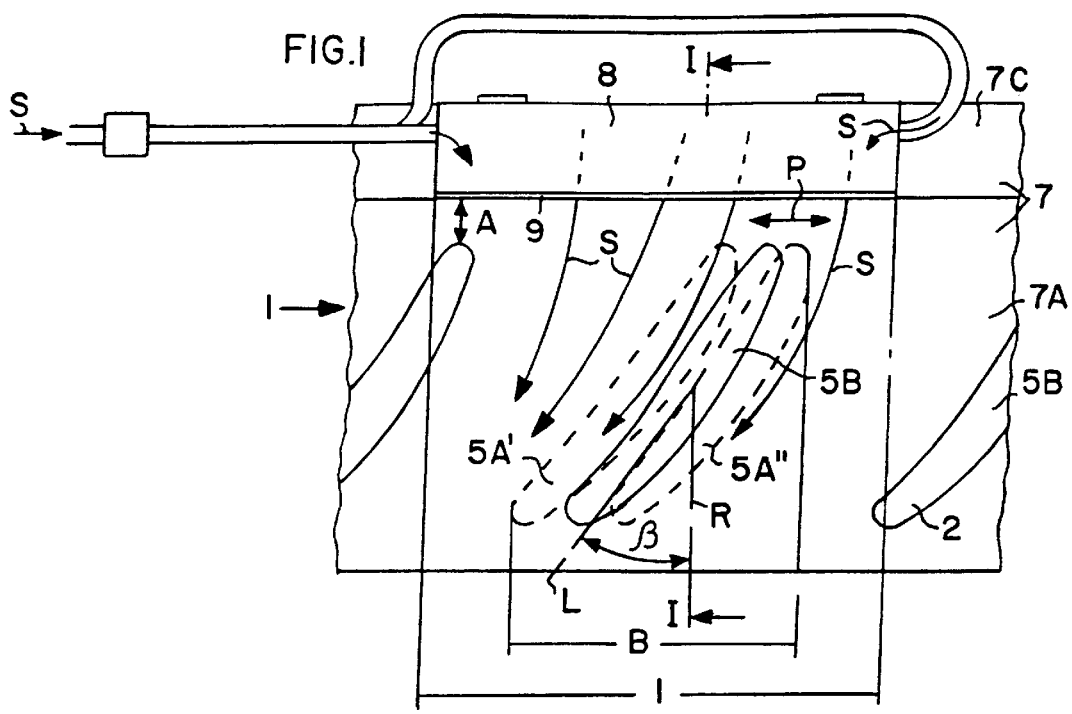
Fig. 1 shows a partial view of a rotor disk for a flow machine with a shielding gas shower mounted thereon.
Figure 2:
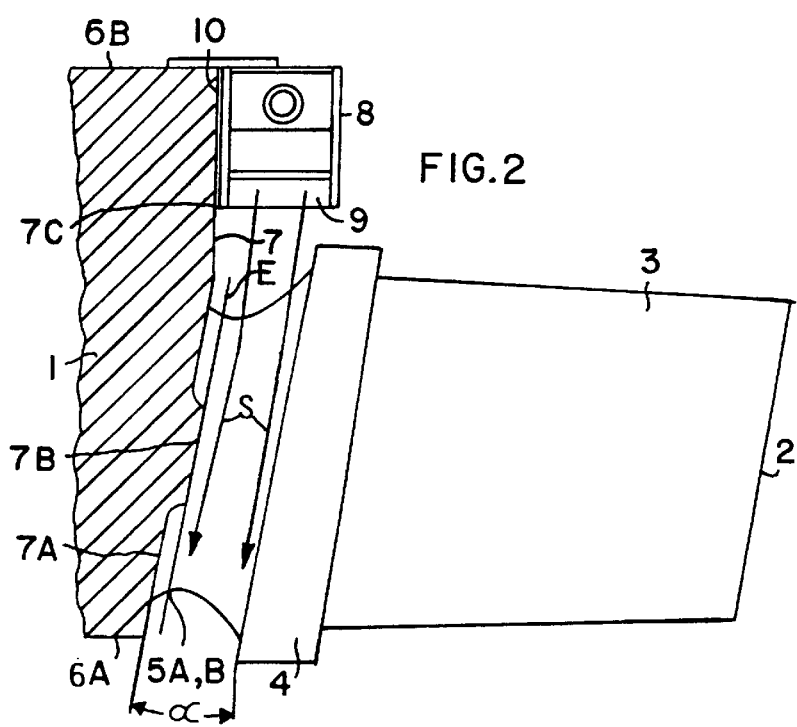
Fig. 2 shows a sectional view of the bladed disk along the section line I-I of Fig. 1.

Figs. 1 and 2 relate to the blade arrangement of a rotor disk for a flow machine such as a jet engine. The rotor disk comprises a blade carrier 1 embodied as a disk onto which a number of similar blades 2 are frictionally welded. The blade carrier 1 and the blades 2 are prepared of a titanium alloy. After the blades 2 or the blade raw blanks are frictionally welded onto the blade carrier 1, the blade roots are subjected to a finished operation in which material is removed in order to give the blades 2 the final form. A typical blade 2 for axially constructed flow machines comprises a blade vane 3 and a blade root 4, which terminates in a flat planar welding surface 5a in the raw unfinished condition. The blade vane 3 is relatively long and thin in the radial direction, and comprises a curved form, whereby one major surface of the blade is concave and the other major surface of the blade is convex. The welding surface 5a as seen in a plan view comprises a contour that is similar to that of the blade profile. The quadratic block-shaped blade root 4 adjoins the blade vane 3. The welding surface 5a is spaced by a few millimeters, approximately 2 to 8 mm, from the rest of the quadratic block-shaped part of the blade root 4 by means of a pedestal. During the friction welding, oscillating, clamping, and compressive upsetting forces are applied via the blade root 4 onto the blade 2 or the welding surface 5a.

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Please delete and replace the paragraph at Col. 3, line 42 to line 49, to read as follows > The blade carrier 1 comprises essentially planar, mutually parallel end faces 6a and 6b having a circular shaped plan view. The essentially rotationally symmetrically configured blade carrier 1 comprises a rotation axis R that corresponds to the rotation axis of the flow machine. The end faces 6a and 6b extend perpendicularly to the rotation axis R. The circumferential surface 7 of the blade carrier 1 extends between the outer edges of the end faces 6a and 6b.

Please delete and replace the paragraph at Col. 3, line 50 to line 58, to read as follows > A plurality of slightly protruding webs 7a is formed on the circumferential surface 7. Each web 7a is machined to a planar welding surface 5b, of which the contour essentially corresponds to the welding surface 5a of the blade 2. As can be seen in Fig. 1, the longitudinal axis L of each welding surface 5b is tilted by the blade angle $\beta$ relative to a straight line parallel to the rotation axis R. The longitudinal axis L of a welding surface 5b essentially corresponds to the projected chord line of the blade root profile.

Please delete and replace the paragraph at Col. 3, line 59 to line 67, to read as follows > In practice, most blade carriers 1 are so configured that the circumferential surface 7 comprises a configuration corresponding to that of a conical-section. As can be seen in Fig. 2, the welding surfaces 5b or the blades 2 are mounted on a conical-section shaped section 7b of the circumferential surface 7. A cylindrical section 7c of the circumferential surface 7 adjoins the conical-section shaped section 7b. The conical-section shaped section 7b comprises a taper angle $\alpha$ relative to the cylindrical section.

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Please delete and replace the paragraph at Col. 4, line 1 to line 26, to read as follows > For the friction welding process, the blade carrier 1 is secured in a position in such a manner that the welding surface 5b to be provided with blades lies in a plane E, which extends parallel to the direction P of the translational oscillating motion. The welding surface 5b to be provided with blades thus is located in the so-called welding position. As can be seen in Fig. 1, the direction P of the oscillating motion P, which the blade 2 carries out relative to the blade carrier 1, extends perpendicularly to the rotor axis R, while in Fig. 2 the direction of the oscillating motion P is to be imagined as perpendicular to the drawing plane. During the friction welding of a blade 2 onto the blade carrier 1, the welding surface 5a of the blade 2 is brought into contact with the associated welding surface 5b of the blade carrier 1, as can be seen in Fig. 2. In order to develop the necessary welding temperature, a compressive upsetting force is applied to the blade 2 perpendicularly to the welding surfaces 5a,b, and simultaneously the blade 2 is moved rapidly back and forth relative to the blade carrier 1, so that friction heat is developed. If sufficient heat is developed, the oscillating motion is discontinued and the upsetting force is maintained, until the blade 2 is finally welded and connected to the blade carrier 1. Next, the blade carrier 1 is released and rotated into a position in which a further blade 2 can be welded on. This sequence is repeated until all blades 2 are welded onto the blade carrier 1.

Please delete and replace the paragraph at Col. 3, line 27 to line 31, to read as follows > The blade raw blanks are next subjected to a forming process, in which material is removed from each blade root 4, in order to achieve exactly the desired blade form. The forming process can be carried out both by chip removal as well as electrochemically.

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Please delete and replace the paragraph at Col. 4, line 32 to line 51, to read as follows > The welding surfaces 5a' and 5a" shown by dashed lines in Fig. 1 indicate the extreme positions or the amplitude of the blade-side welding surface 5a, which this blade-side welding surface 5a carries out during the oscillating motion or relative motion P with respect to the carrier-side welding surface 5b. In this context, the blade-side welding surface 5a passes over an area of which the largest dimension measures $b$ in the direction of the oscillating motion, that is to say perpendicularly to the rotor axis R. As can be seen in Fig. 1, the welding surfaces 5a,5b are temporarily only partly surfacially in contact with one another during the friction welding motion, so that the exposed partial surface would be exposed to access by air. This would result, due to exposure to the air, in an undesired oxide formation on the welding surface, especially in the area of the ends or corners of the weld surfaces. In order to prevent this oxidation, which in principle does not arise in the typical friction welding process, a gas shower 8 is provided that showers the weld surfaces 5a, 5b with a shielding gas flow S.

Please delete and replace the paragraph at Col. 4, line 52 to Col. 5, line 4, to read as follows > The shielding gas shower 8 is mounted on the cylindrical circumferential section 7c of the blade carrier 1 for the supply of the shielding gas. The shielding gas shower 8 comprises a circular arc-shaped curved gas outlet opening 9, which extends over the arc length $l$ on the circumferential surface 7. The gas outlet opening 9, which extends perpendicularly to the rotor axis R, is spaced in the axial direction from the carrier-side welding surface 5b, whereby the spacing $a$ is smaller than the dimension $b$, which designates the extension of the area that is passed over. In order to protect the welding surfaces 5a, 5b against air access from all sides, the length $l$ of the gas outlet opening 9 is maintained at least 50% larger than the area $b$ that is passed over by the weld surfaces 5a. The central arrangement of the gas outlet opening 9 over the area $b$ ensures that even the outer ends of the welding surfaces 5a, 5b can be held within a closed shielding gas curtain for the full extent of the oscillating motion. The dimension of the gas outlet opening 9 in the radial direction is also so dimensioned that a sufficient shielding gas curtain is formed, which prevents the entry of air.

UNITED STATES PATENT AND TRADEMARK OFFICE
CERTIFICATE OF CORRECTION

PATENT NO.    : 6,199,744 B1
DATED         : March 13, 2001
INVENTOR(S)   : Schneefeld et al.

It is certified that error appears in the above-identified patent and that said Letters Patent is hereby corrected as shown below:

Please delete and replace the paragraph at Col. 5, line 5 to line 15, to read as follows > The arrangement of the gas outlet opening 9 relative to the flow-impinged welding surfaces 5a,5b or the blade 2 enables a gas flow at the blade 2 at the blade angle β, which comes very close to the actual flow conditions during the operation of the flow machine, so that an adherent shielding gas flow S is formed, which sufficiently reduces a mixing with the surrounding ambient air at least in the area of the welding surfaces 5a, 5b. As shown by the flow lines S of Figs. 1 and 2, the flow lines S substantially follow the contour of the blade root 4 in the area of the profiled welding surfaces 5a,b and the conical-section shaped section 7b of the circumferential surface 7 tilted at the angle α.

Please delete and replace the paragraph at Col. 5, line 16 to line 22, to read as follows > In order to prevent the entry of air between the shielding gas shower and the circumferential surface 7 with a consequent mixing of the shielding gas with the surrounding ambient air, the shielding gas shower 8 is embodied with an arc-shape as can be seen in Fig. 3c, so that its radially inner housing wall 10 lies against the cylindrical section 7c of the circumferential surface 7 in a substantially gap-free manner.

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Please delete and replace the paragraph at Col. 5, line 23 to line 48, to read as follows > As shown by the Figs. 3a to 3c, the shielding gas shower 8 comprises a welded sheet metal housing 11, two pipe conduits 12a and 12b for the gas supply, and flow distribution means 13. The two pipe conduits 12a and 12b for supplying the gas are connected to the box and circular arc-shaped sheet metal housing 11, whereby respectively one pipe conduit 12a, 12b enters into the housing 11 at each of the end faces 14a,b of the circumferential ends of the housing wall 10. There, in the housing 11, the pipe conduits 12a, 12b extend in a gas chamber 15 to approximately the center of the sheet metal housing 11. The gas chamber 15 and the pipe conduits 12a, 12b extending therein are arranged approximately in an upper third in the shielding gas shower 8 on a side opposite the gas outlet opening 9. The pipe conduits 12a, 12b are perforated with numerous openings within the gas chamber 15, so that a uniform supply of the shielding gas into the gas chamber is ensured. On an opposite side of the gas chamber 15, the sheet metal housing 11 is opened and thus forms the longitudinally extending arc-shaped gas outlet opening 9. A means 13 for flow distribution, which is formed of many layers, comprising steel wool and filter material, is provided between the gas outlet opening 9 and the gas chamber 15, thus in the bottom half of the shielding gas shower 8. The layers of steel wool and filter material lead to a uniformalization of the shield gas flow S over the entire gas outlet opening 9.

UNITED STATES PATENT AND TRADEMARK OFFICE
CERTIFICATE OF CORRECTION

PATENT NO. : 6,199,744 B1
DATED : March 13, 2001
INVENTOR(S) : Schneefeld et al.

It is certified that error appears in the above-identified patent and that said Letters Patent is hereby corrected as shown below:

Please delete and replace the paragraph at Col. 5, line 49 to line 51, to read as follows Two securing bails 17 are mounted on the sheet metal housing 11 for securing the shielding gas shower 8 on the blade carrier 1.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

Signed and Sealed this

Thirteenth Day of November, 2001

Attest:

*Nicholas P. Godici*

NICHOLAS P. GODICI
*Attesting Officer*  *Acting Director of the United States Patent and Trademark Office*